United States Patent
Dutta et al.

(10) Patent No.: US 8,433,241 B2
(45) Date of Patent: Apr. 30, 2013

(54) SYSTEMS, METHODS AND DEVICES FOR OVERLAID OPERATIONS OF SATELLITE AND TERRESTRIAL WIRELESS COMMUNICATIONS SYSTEMS

(75) Inventors: Santanu Dutta, Vienna, VA (US); Gary G. Churan, Annandale, VA (US); Dunmin Zheng, Vienna, VA (US); Serge Nguyen, Fairfax Station, VA (US)

(73) Assignee: ATC Technologies, LLC, Reston, VA (US)

( * ) Notice: Subject to any disclaimer, the term of this patent is extended or adjusted under 35 U.S.C. 154(b) by 938 days.

(21) Appl. No.: 12/536,084

(22) Filed: Aug. 5, 2009

(65) Prior Publication Data

US 2010/0035604 A1    Feb. 11, 2010

Related U.S. Application Data

(60) Provisional application No. 61/086,489, filed on Aug. 6, 2008.

(51) Int. Cl.
*H04B 7/185* (2006.01)

(52) U.S. Cl.
USPC ........................................... 455/13.4

(58) Field of Classification Search ............ 455/13.4
See application file for complete search history.

(56) References Cited

U.S. PATENT DOCUMENTS

| | | |
|---|---|---|
| 4,901,307 A | 2/1990 | Gilhousen et al. |
| 5,073,900 A | 12/1991 | Mallinckrodt |
| 5,303,286 A | 4/1994 | Wiedeman |

(Continued)

FOREIGN PATENT DOCUMENTS

| | | |
|---|---|---|
| EP | 0 506 255 A2 | 9/1992 |
| EP | 0 597 225 A1 | 5/1994 |

(Continued)

OTHER PUBLICATIONS

Ayyagari, D., and A. Ephremides, "A satellite-augmented cellular network concept", *Wireless Networks*, vol. 4, No. 2, 1998, pp. 189-198.

(Continued)

*Primary Examiner* — Yuwen Pan
*Assistant Examiner* — Ankur Jain
(74) *Attorney, Agent, or Firm* — Myers Bigel Sibley & Sajovec, P.A.

(57) ABSTRACT

A communications system includes a space-based network (SBN) including a plurality of spotbeams using a first set of frequencies and an ancillary terrestrial network (ATN) including a plurality of base stations using a second set of radio frequencies. In a coverage zone of a given spot beam wherein the SBN and the ATN use at least one frequency from the first and second sets of frequencies in common, the SBN uses a narrower bandwidth than the ATN on both forward and return links, the ATN employs frequency spreading on at least its return link communications, the SBN employs spatial beam nulling directed toward at least one ancillary terrestrial component (ATC) of the ATN, the SBN employs forward link margin control, the ATN employs return link power control, the SBN employs return link power control and base stations of the ATN provide isolation in the direction of at least one satellite of the SBN. Using such a combination of measures, the ATN and the SBN may support completely or partially overlapping use of the first and second sets of radio frequencies.

40 Claims, 5 Drawing Sheets

U.S. PATENT DOCUMENTS

| | | |
|---|---|---|
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,275,188 B1 | 8/2001 | Chen |
| 6,324,405 B1 | 11/2001 | Young et al. |
| 6,339,707 B1 | 1/2002 | Wainfan et al. |
| 6,405,039 B1* | 6/2002 | Koorapaty et al. ........... 455/434 |
| 6,418,147 B1 | 7/2002 | Wiedeman |
| 6,449,461 B1 | 9/2002 | Otten |
| 6,522,865 B1 | 2/2003 | Otten |
| 6,628,919 B1 | 9/2003 | Curello et al. |
| 6,684,057 B2 | 1/2004 | Karabinis |
| 6,735,437 B2 | 5/2004 | Mayfield et al. |
| 6,775,251 B1 | 8/2004 | Wiedeman et al. |
| 6,785,543 B2 | 8/2004 | Karabinis |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,031,702 B2 | 4/2006 | Karabinis et al. |
| 7,039,400 B2 | 5/2006 | Karabinis et al. |
| 7,062,267 B2 | 6/2006 | Karabinis |
| 7,092,708 B2 | 8/2006 | Karabinis |
| 7,113,743 B2 | 9/2006 | Karabinis |
| 7,113,778 B2 | 9/2006 | Karabinis |
| 7,155,340 B2 | 12/2006 | Churan |
| 7,174,127 B2 | 2/2007 | Otten et al. |
| 7,181,161 B2 | 2/2007 | Karabinis |
| 7,203,490 B2 | 4/2007 | Karabinis |
| 7,218,931 B2 | 5/2007 | Karabinis |
| 7,295,807 B2 | 11/2007 | Karabinis |
| 7,340,213 B2 | 3/2008 | Karabinis et al. |
| 7,418,236 B2 | 8/2008 | Levin et al. |
| 7,418,263 B2 | 8/2008 | Dutta et al. |
| 7,421,342 B2 | 9/2008 | Churan |
| 7,437,123 B2 | 10/2008 | Karabinis et al. |
| 7,444,170 B2 | 10/2008 | Karabinis |
| 7,447,501 B2 | 11/2008 | Karabinis |
| 7,453,396 B2 | 11/2008 | Levin et al. |
| 7,454,175 B2 | 11/2008 | Karabinis |
| 7,457,269 B1 | 11/2008 | Grayson |
| 7,558,568 B2 | 7/2009 | Karabinis |
| 7,574,206 B2 | 8/2009 | Karabinis |
| 7,587,171 B2 | 9/2009 | Evans et al. |
| 7,593,691 B2 | 9/2009 | Karabinis |
| 7,593,724 B2 | 9/2009 | Karabinis |
| 7,593,725 B2 | 9/2009 | Karabinis |
| 7,593,726 B2 | 9/2009 | Karabinis et al. |
| 7,596,111 B2 | 9/2009 | Karabinis |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0149986 A1 | 8/2003 | Mayfield et al. |
| 2004/0072539 A1 | 4/2004 | Monte et al. |
| 2004/0102156 A1 | 5/2004 | Loner |
| 2004/0121727 A1 | 6/2004 | Karabinis |
| 2004/0203393 A1 | 10/2004 | Chen |
| 2004/0240525 A1 | 12/2004 | Karabinis et al. |
| 2005/0026606 A1 | 2/2005 | Karabinis |
| 2005/0041619 A1 | 2/2005 | Karabinis et al. |
| 2005/0079816 A1 | 4/2005 | Singh et al. |
| 2005/0090256 A1 | 4/2005 | Dutta |
| 2005/0118948 A1 | 6/2005 | Karabinis et al. |
| 2005/0136836 A1* | 6/2005 | Karabinis et al. ........... 455/12.1 |
| 2005/0164700 A1 | 7/2005 | Karabinis |
| 2005/0164701 A1 | 7/2005 | Karabinis et al. |
| 2005/0181786 A1 | 8/2005 | Karabinis et al. |
| 2005/0201449 A1 | 9/2005 | Churan |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0040613 A1 | 2/2006 | Karabinis et al. |
| 2006/0040659 A1 | 2/2006 | Karabinis |
| 2006/0094352 A1 | 5/2006 | Karabinis |
| 2006/0094420 A1 | 5/2006 | Karabinis |
| 2006/0105707 A1 | 5/2006 | Karabinis |
| 2006/0111041 A1 | 5/2006 | Karabinis |
| 2006/0111056 A1 | 5/2006 | Dutta |
| 2006/0135058 A1 | 6/2006 | Karabinis |
| 2006/0135070 A1 | 6/2006 | Karabinis |
| 2006/0165120 A1 | 7/2006 | Karabinis |
| 2006/0189274 A1 | 8/2006 | Karabinis |
| 2006/0189275 A1 | 8/2006 | Karabinis |
| 2006/0189309 A1 | 8/2006 | Good et al. |
| 2006/0194576 A1 | 8/2006 | Karabinis et al. |
| 2006/0205346 A1 | 9/2006 | Evans et al. |
| 2006/0205347 A1 | 9/2006 | Karabinis |
| 2006/0205367 A1 | 9/2006 | Karabinis |
| 2006/0211371 A1 | 9/2006 | Karabinis et al. |
| 2006/0211419 A1 | 9/2006 | Karabinis |
| 2006/0211452 A1 | 9/2006 | Karabinis |
| 2006/0217070 A1 | 9/2006 | Karabin |
| 2006/0246838 A1 | 11/2006 | Karabinis |
| 2006/0252368 A1 | 11/2006 | Karabinis |
| 2006/0276129 A1 | 12/2006 | Karabinis |
| 2006/0292990 A1 | 12/2006 | Karabinis et al. |
| 2007/0010246 A1 | 1/2007 | Churan |
| 2007/0015460 A1 | 1/2007 | Karabinis et al. |

| | | |
|---|---|---|
| 2007/0021059 A1 | 1/2007 | Karabinis et al. |
| 2007/0021060 A1 | 1/2007 | Karabinis et al. |
| 2007/0026867 A1 | 2/2007 | Karabinis |
| 2007/0037514 A1 | 2/2007 | Karabinis |
| 2007/0072545 A1 | 3/2007 | Karabinis et al. |
| 2007/0087690 A1 | 4/2007 | Karabinis |
| 2007/0099562 A1 | 5/2007 | Karabinis et al. |
| 2007/0123252 A1 | 5/2007 | Tronc et al. |
| 2007/0129019 A1 | 6/2007 | Otten et al. |
| 2007/0135051 A1 | 6/2007 | Zheng et al. |
| 2007/0149127 A1 | 6/2007 | Karabinis |
| 2007/0184849 A1 | 8/2007 | Zheng |
| 2007/0192805 A1 | 8/2007 | Dutta et al. |
| 2007/0202816 A1 | 8/2007 | Zheng |
| 2007/0232298 A1 | 10/2007 | Karabinis |
| 2007/0243866 A1 | 10/2007 | Karabinis |
| 2007/0281612 A1 | 12/2007 | Benjamin et al. |
| 2007/0293214 A1 | 12/2007 | Ansari et al. |
| 2008/0008264 A1 | 1/2008 | Zheng |
| 2008/0032671 A1 | 2/2008 | Karabinis |
| 2008/0032690 A1 | 2/2008 | Karabinis |
| 2008/0113666 A1 | 5/2008 | Monte et al. |
| 2008/0119190 A1 | 5/2008 | Karabinis |
| 2008/0160993 A1 | 7/2008 | Levin et al. |
| 2008/0182572 A1 | 7/2008 | Tseytlin et al. |
| 2008/0214207 A1 | 9/2008 | Karabinis |
| 2008/0268836 A1 | 10/2008 | Karabinis et al. |
| 2009/0011704 A1 | 1/2009 | Karabinis |
| 2009/0029696 A1 | 1/2009 | Karabinis |
| 2009/0040100 A1 | 2/2009 | Levin et al. |
| 2009/0042509 A1 | 2/2009 | Karabinis et al. |
| 2009/0042516 A1 | 2/2009 | Karabinis |
| 2009/0075645 A1 | 3/2009 | Karabinis |
| 2009/0088151 A1 | 4/2009 | Karabinis |
| 2009/0104903 A1 | 4/2009 | Karabinis |
| 2009/0131046 A1 | 5/2009 | Karabinis et al. |
| 2009/0137203 A1 | 5/2009 | Karabinis et al. |
| 2009/0156154 A1 | 6/2009 | Karabinis et al. |
| 2009/0170427 A1 | 7/2009 | Karabinis |
| 2009/0170428 A1 | 7/2009 | Karabinis |
| 2009/0170429 A1 | 7/2009 | Karabinis |
| 2009/0186622 A1 | 7/2009 | Karabinis |
| 2009/0231187 A1 | 9/2009 | Churan |

FOREIGN PATENT DOCUMENTS

| | | |
|---|---|---|
| EP | 0 748 065 A2 | 12/1996 |
| EP | 0 755 163 A2 | 1/1997 |
| EP | 0 762 669 A2 | 3/1997 |
| EP | 0 797 319 A2 | 9/1997 |
| EP | 0 831 599 A2 | 3/1998 |
| EP | 1 059 826 A1 | 12/2000 |
| EP | 1 193 989 A1 | 4/2002 |
| EP | 1 944 885 A2 | 7/2008 |
| EP | 1 569 363 A1 | 11/2008 |
| WO | WO 01/54314 A1 | 7/2001 |
| WO | WO 01/89102 A1 | 11/2001 |
| WO | WO 2005/046255 A2 | 5/2005 |

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

International Search Report dated Dec. 12, 2009, for corresponding PCT Application No. PCT/US2009/004525, filed Aug. 6, 2009.

* cited by examiner

SYSTEMS, METHODS AND DEVICES FOR OVERLAID OPERATIONS OF SATELLITE AND TERRESTRIAL WIRELESS COMMUNICATIONS SYSTEMS

CROSS REFERENCE TO RELATED APPLICATION

The present application claims the benefit of and priority to U.S. Provisional Patent Application No. 61/086,489, filed Aug. 6, 2008, entitled "Geographically and Spectrally Overlaid Operation of Mobile Satellite Services and Ancillary Terrestrial Component," the disclosure of which is hereby incorporated herein by reference in its entirety.

BACKGROUND

This invention relates to wireless communications systems, methods and components thereof and more particularly to satellite and terrestrial wireless communications systems, methods and components thereof.

Satellite radiotelephone communications systems and methods are widely used for radiotelephone communications. Satellite radiotelephone communications systems and methods generally employ at least one space-based component, such as one or more satellites, that is/are configured to wirelessly communicate with a plurality of satellite radiotelephones.

A satellite radiotelephone communications system or method may utilize a single satellite antenna pattern (beam or cell) covering an entire service region served by the system. Alternatively or in combination with the above, in cellular satellite radiotelephone communications systems and methods, multiple satellite antenna patterns (beams or cells) are provided, each of which can serve a substantially distinct service region in an overall service region, to collectively provide service to the overall service region. Thus, a cellular architecture that is similar to that used in conventional terrestrial cellular radiotelephone systems and methods can be implemented in cellular satellite-based systems and methods. The satellite typically communicates with radiotelephones over a bidirectional communications pathway, with radiotelephone communications signals being communicated from the satellite to the radiotelephone over a downlink or forward link (also referred to as forward service link), and from the radiotelephone to the satellite over an uplink or return link (also referred to as return service link). In some cases, such as, for example, in broadcasting, the satellite may communicate information to one or more radioterminals unidirectionally.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. A radiotelephone also may be referred to herein as a "radioterminal," a "mobile terminal," a "user device," a "wireless transmitter," a "wireless receiver," a "transceiver" or simply as a "terminal". As used herein, the term(s) "radioterminal," "radiotelephone," "mobile terminal," "user device," "wireless transmitter," "wireless receiver," "transceiver" and/or "terminal" also include(s) any other radiating user device, equipment and/or source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Furthermore, as used herein, the term "space-based component" or "space-based system" includes one or more satellites at any orbit (geostationary, substantially geostationary, medium earth orbit, low earth orbit, etc.) and/or one or more other objects and/or platforms (e.g., airplanes, balloons, unmanned vehicles, space crafts, missiles, etc.) that has/have a trajectory above the earth at any altitude.

Terrestrial networks can enhance cellular satellite radiotelephone system availability, efficiency and/or economic viability by terrestrially using/reusing at least some of the frequencies that are allocated to cellular satellite radiotelephone systems. In particular, it is known that it may be difficult for cellular satellite radiotelephone systems to reliably serve densely populated areas, because satellite signals may be blocked by high-rise structures and/or may not penetrate into buildings. As a result, satellite spectrum may be underutilized or unutilized in such areas. The terrestrial use/reuse of at least some of the satellite system frequencies can reduce or eliminate this potential problem.

Moreover, the capacity of an overall hybrid system, comprising space-based (i.e., satellite) and terrestrial communications capability, may be increased by the introduction of terrestrial frequency use/reuse of frequencies authorized for use by the space-based component, since terrestrial frequency use/reuse may be much denser than that of a satellite-only system. In fact, capacity may be enhanced where it may be mostly needed, i.e., in densely populated urban/industrial/commercial areas. As a result, the overall system may become more economically viable, as it may be able to serve more effectively and reliably a larger subscriber base.

One example of terrestrial reuse of satellite frequencies is described in U.S. Pat. No. 5,937,332 to inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink/uplink signal received from a satellite/radioterminal thereby increasing an effective downlink/uplink margin in the vicinity of the satellite telecommunications repeater and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Satellite radiotelephones for a satellite radiotelephone system or method having a terrestrial communications capability by terrestrially using/reusing at least some frequencies of a satellite frequency band and using substantially the same air interface for both terrestrial and satellite communications may be more cost effective and/or aesthetically appealing compared to other alternatives. Conventional dual band/dual mode radiotelephone alternatives, such as the well known Thuraya, Iridium and/or Globalstar dual mode satellite/terrestrial radiotelephones, duplicate some components (as a result of the different frequency bands and/or air interface protocols between satellite and terrestrial communications), which leads to increased cost, size and/or weight of the radiotelephone. See U.S. Pat. No. 6,052,560 to inventor Karabinis, entitled Satellite System Utilizing a Plurality of Air Interface Standards and Method Employing Same.

Satellite radioterminal communications systems and methods that may employ terrestrial use and/or reuse of satellite frequencies by an Ancillary Terrestrial Network (ATN) comprising at least one Ancillary Terrestrial Component (ATC) are also described in U.S. Pat. Nos. 6,684,057 to Karabinis, entitled Systems and Methods for Terrestrial Reuse of Cellular Satellite Frequency Spectrum; 6,785,543 to Karabinis, entitled Filters for Combined Radiotelephone/GPS Terminals; 6,856,787 to Karabinis, entitled Wireless Communications Systems and Methods Using Satellite-Linked Remote Terminal Interface Subsystems; 6,859,652 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; and 6,879,829 to Dutta et al., entitled Systems and Methods for Handover Between Space Based and Terrestrial Radioterminal Communications, and For Monitoring Terrestrially Reused Satellite Frequencies At a Radioterminal to Reduce Potential Interference, and in U.S. Pat. Nos. 6,892,068, 6,937,857, 6,999,720 and 7,006,789; and Published U.S. Patent Application Nos. US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2002/0041575 to Karabinis et al., entitled Coordinated Satellite-Terrestrial Frequency Reuse; US 2003/0068978 to Karabinis et al., entitled Space-Based Network Architectures for Satellite Radiotelephone Systems; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, and in Published U.S. Patent Application Nos. 2004/0121727, 2004/0142660, 2004/0192395, 2004/0192200, 2004/0192293, 2004/0203742, 2004/0240525, 2005/0026606, 2005/0037749, 2005/0041619, 2005/0064813, 2005/0079816, 2005/0090256, 2005/0118948, 2005/0136836, 2005/0164700, 2005/0164701, 2005/0170834, 2005/0181786, 2005/0201449, 2005/0208890, 2005/0221757, 2005/0227618, 2005/0239457, 2005/0239403, 2005/0239404, 2005/0239399, 2005/0245192, 2005/0260984, 2005/0260947, 2005/0265273, 2005/00272369, 2005/0282542, 2005/0288011, 2006/0040613, 2006/040657 and 2006/0040659; all of which are assigned to the assignee of the present invention, the disclosures of all of which are hereby incorporated herein by reference in their entirety as if set forth fully herein.

SUMMARY

Some embodiments of the present invention provide a communications system including a space-based network (SBN) including a plurality of spotbeams using a first set of frequencies and an ancillary terrestrial network (ATN) including a plurality of base stations using a second set of radio frequencies. In a coverage zone of at least one spot beam, the SBN and the ATN use at least one frequency from the first and second sets of frequencies in common. In the coverage zone, the SBN uses a narrower bandwidth than the ATN on both forward and return links, the ATN employs frequency spreading on at least its return link communications, the SBN employs spatial beam nulling directed toward at least one ancillary terrestrial component (ATC) of the ATN, the SBN employs forward link margin control, the ATN employs return link power control, the SBN employs return link power control and base stations of the ATN provide isolation in the direction of at least one satellite of the SBN. Using such a combination of measures, the ATN and the SBN may support completely or partially frequency-overlapping use of the first and second sets of radio frequencies.

In some embodiments, the SBN employs fixed and/or adaptive return link spatial beam nulling. For example, the SBN may employ waveform-blind and/or waveform-aware adaptive return link spatial beam nulling. The SBN may employ, for example, return link beamforming based on a linear constrained mean variance (LCMV) algorithm.

In further embodiments, base stations of the ATN employ spectral nulling at frequencies from the first set of radio frequencies. The SBN may also employ forward link spatial beam nulling towards at least one ATC of the ATN.

In some embodiments, the forward link margin control employed by the SBN may be configured to provide a terminal communicating with the SBN increased link margin to override interference from a proximate ATN base station. In particular, the forward link margin control employed by the SBN may be configured to provide a terminal communicating with the SBN increased link margin to override interference from a proximate ATN base station until the terminal is in a nominal coverage zone of the proximate ATN base station. The forward link margin control employed by the SBN may include, for example, adaptive power control and/or adaptive information rate control.

In further embodiments, the system also includes a mobility manager configured to support transfer of communications of a terminal between the SBN and the ATN based on proximity to a base station of the ATN. For example, the mobility manager may support idle roaming and/or in-call handover. The mobility manager may be configured to support transfer of terminal communications between the SBN and the ATN using location information from a location information source other than the SBN or the ATN, such as information from GPS.

Additional embodiments of the present invention provide methods of operating a communications system including an SBN including a plurality of spotbeams using a first set of frequencies and an ATN including a plurality of base stations using a second set of radio frequencies. The SBN and the ATN are operated such that, in a given coverage zone of at least one spot beam, the SBN and the ATN use at least one frequency from the first and second sets of frequencies in common. In the coverage zone, the SBN uses a narrower bandwidth than the ATN on both forward and return links, the ATN employs frequency spreading on at least its return link communications, the SBN employs spatial beam nulling directed toward at least one ATC of the ATN, the SBN employs forward link margin control, the ATN employs return link power control, the SBN employs return link power control and base stations of the ATN provide isolation in the direction of at least one satellite of the SBN. The methods may further include managing terminal mobility to support transfer of communications of a terminal between the SBN and the ATN based on proximity to a base station of the ATN.

BRIEF DESCRIPTION OF THE DRAWINGS

The accompanying drawings, which are included to provide a further understanding of the invention and are incor

DETAILED DESCRIPTION

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected", "coupled" or "responsive" to another element, it can be directly connected, coupled or responsive to the other element or intervening elements may be present. Furthermore, "connected", "coupled" or "responsive" as used herein may include wirelessly connected, coupled or responsive.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "/" is also used as a shorthand notation for "and/or".

The overall design and operation of wireless communications systems and methods are well known to those having skill in the art, and need not be described further herein. Moreover, as used herein, the term "terminal" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. A terminal also may be referred to herein as a "radioterminal", a "mobile terminal" or simply as a "terminal". As used herein, the term(s) "radioterminal," "radiotelephone," "mobile terminal" and/or "terminal" also include(s) any other radiating user device/equipment/source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Furthermore, as used herein, the term "space-based network (SBN)" includes one or more satellites at any orbit (geostationary, substantially geostationary, medium earth orbit, low earth orbit, etc.). An "ancillary terrestrial network (ATN)" may include one or more "ancillary terrestrial components (ATCs)", which may each include a plurality of geographically distributed base stations (e.g., in cellular arrangements), which may be ground installations, vehicle-borne installations, airborne installations and/or ship-borne installations.

Figure 1:
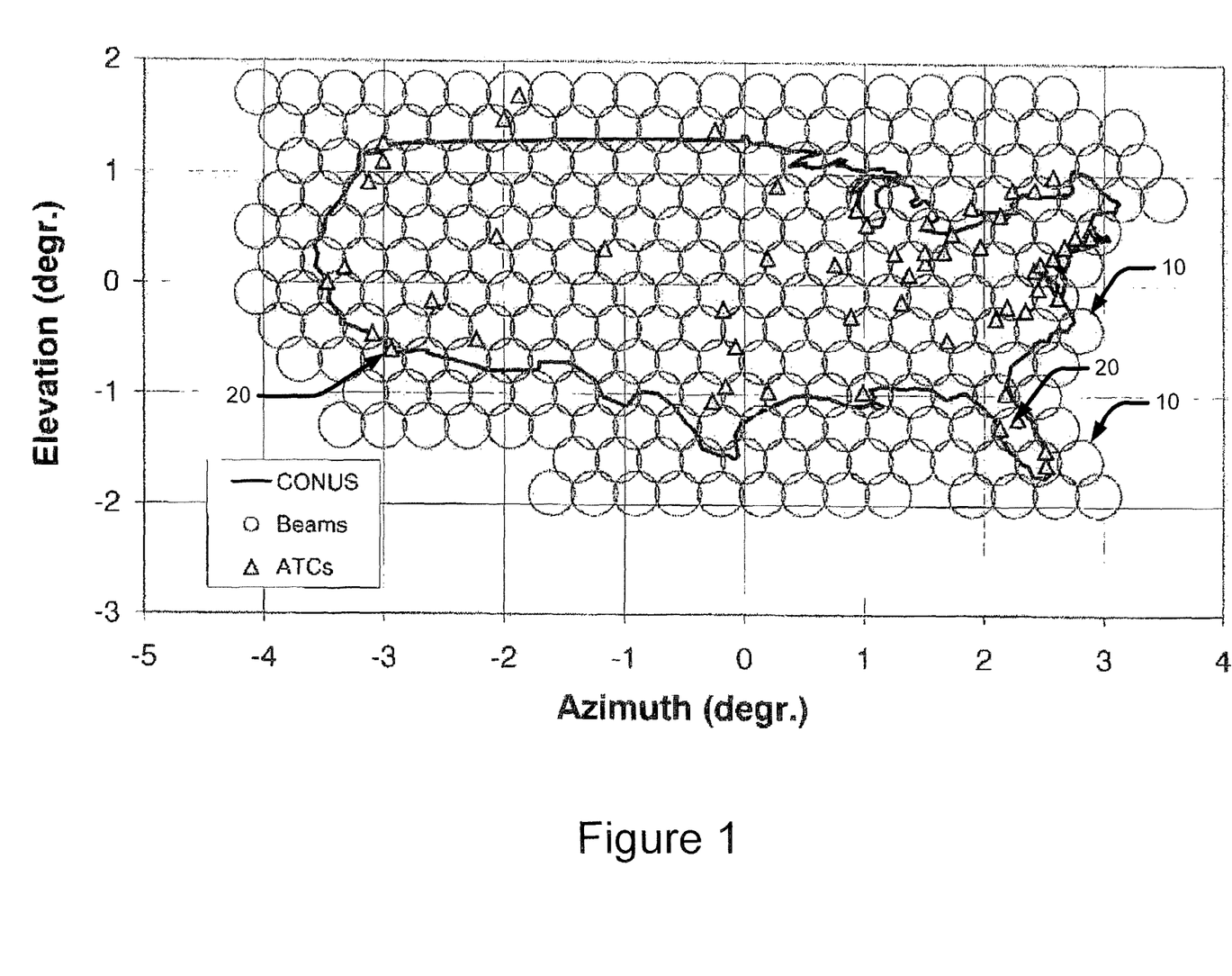
- FIG. 1 is a diagram illustrating overlaid operation of a space-based network (SBN) and an ancillary terrestrial network (ATN) in the continental United States (CONUS) according to some embodiments of the present invention.

Some embodiments of the present invention provide a wireless communications system in which at least a portion of spectrum used for mobile satellite communications may be used to deploy relatively broadband ancillary terrestrial components (ATCs) of an ancillary terrestrial network (ATN) in various locations in a service area, such as in urban/suburban areas of the continental United States (CONUS). Satellite spot beams of a space-based network (SBN) are overlaid on this service area, such that coverage zones of the ATCs and the SBN at least partially overlap. FIG. 1 illustrates such an arrangement for the CONUS, including satellite spot beams 10 and ATCs 20.

According to some embodiments of the present invention, the air interface employed for the SBN spotbeams 10 is relatively narrowband for both forward and return links, while the ATN air interface is relatively broadband. For example, the SBN may use forward and return links having a bandwidth of about 1.25 MHz or less, while the ATN air interface may use about 10 MHz (or wider) forward and return links. Such bandwidth may be compatible with so-called fourth generation ("4G") air interfaces, such as WiMAX and UMTS LTE.

Figure 2:
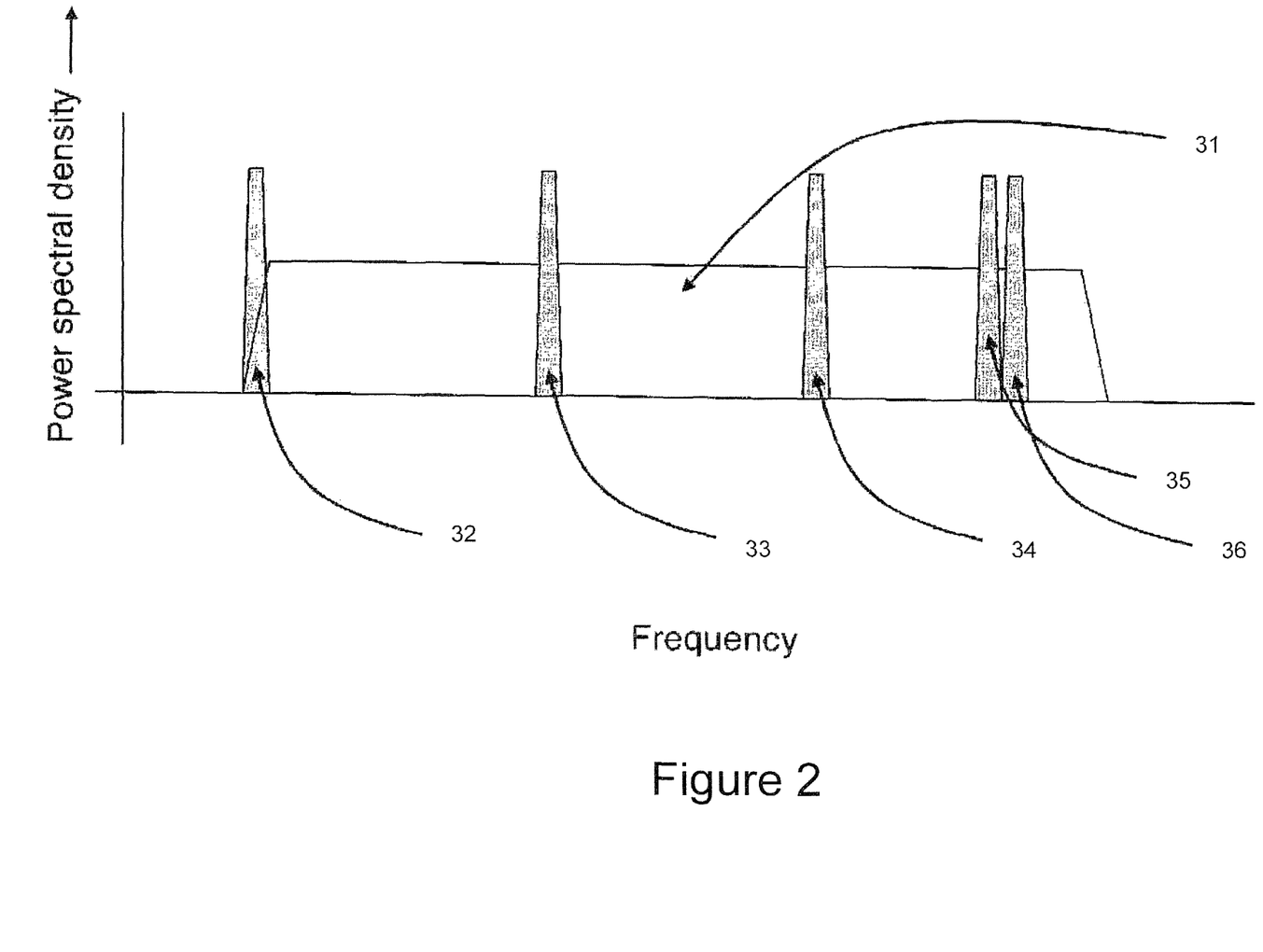
FIG. 2 is a diagram illustrating frequency allocations between a space-based network (SBN) and an ancillary terrestrial network (ATN) according to some embodiments of the present invention.

FIG. 2 illustrates an example of a spectrum allocation according to some embodiments of the present invention. A first set 31 of frequencies is used by an ATN, and may, for example, have a 10 MHz nominal width. In some embodiments, an ATN forward link may have a "fat pipe" structure that substantially occupies the entire set 31 of frequencies, serving several users via, for example, a multiplexing technique such as TDM, FDM, CDM, or OFDM. In the return link, multiple access may be provided to the users using such techniques as TDMA, FDMA, CDMA and/or OFDMA.

For example, in some 4G-type applications, uplink bandwidth may be assigned on demand, depending on the particular transmission requirements of a given terminal. Typically, the bandwidth requirements of a terminal are such that it would be rare to assign the entire uplink bandwidth to one terminal, which means that the instantaneous uplink channel bandwidth requirements for terminals will likely be less than the allocated bandwidth. Nonetheless, systems may frequency-spread the assignment of subband center frequencies to terminals and change these assignments over time such that uplink spectrum occupancy appears broadband with a fairly uniform power spectral density. In sum, from an interference standpoint, both the downlink and uplink spectra may appear broadband with fairly uniform power spectral density, which averaged over a time period sufficiently long to smooth out short term variations caused, for example, by non-ideal allocation of spectrum based on traffic. Spectrum occupancy by an ATN may be identical for all ATCs or may be different.

Still referring to FIG. 2, respective frequency sets 32, 33, 34, 35, 36 for respective spotbeams of an SBM at least partially overlap the frequency set 31 assigned to the ATN. In particular, frequency set 32 partially overlaps, while frequency sets 33, 34, 35 and 36 fully overlap.

Figure 3:
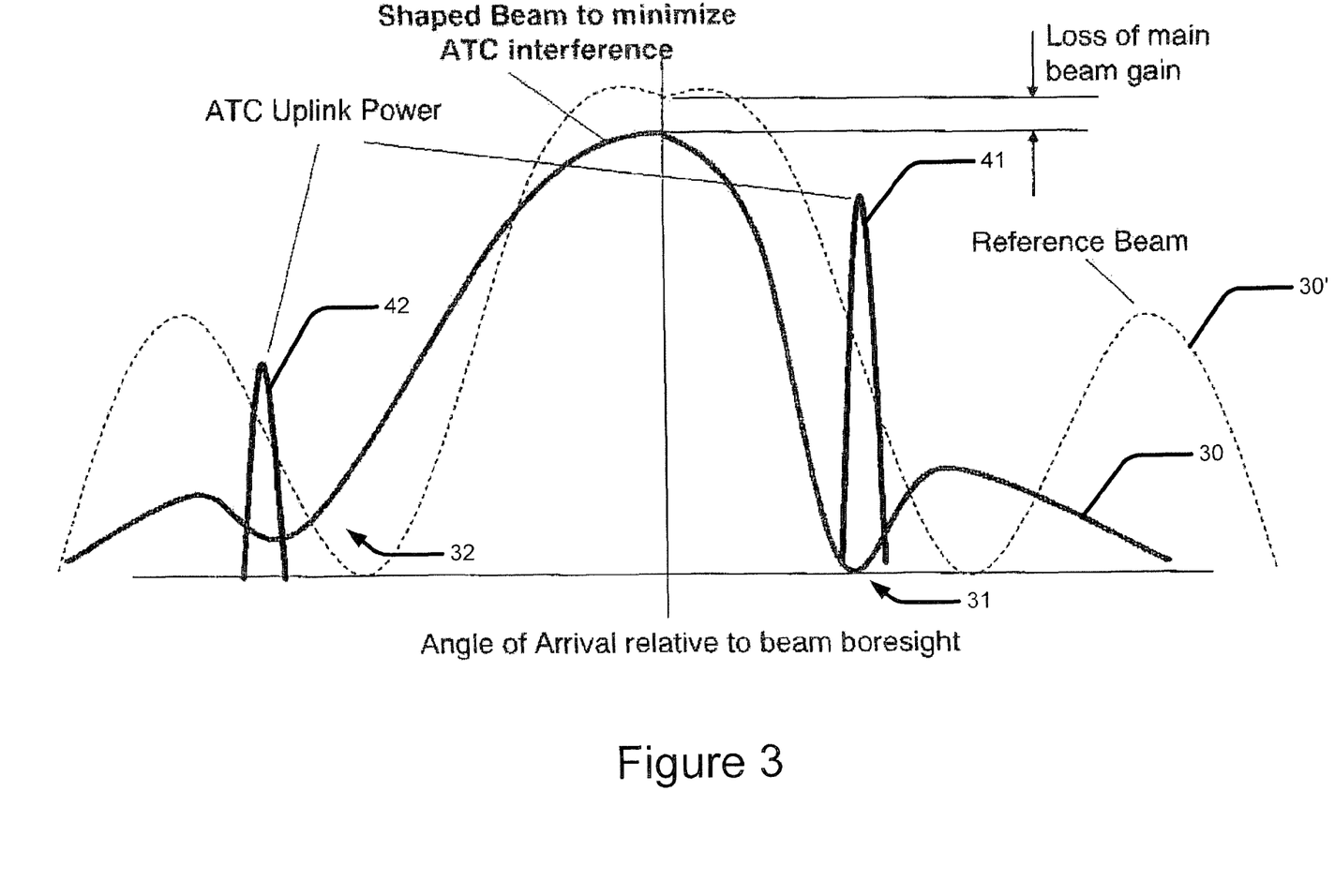
FIG. 3 is a diagram illustrating spatial return link beamforming by an SBN according to some embodiments of the present invention.

According to some embodiments of the present invention, the SBN may use shaped beams having nulls directed toward the location of sources of interference from an overlaid ATN, while maintaining adequate gain towards desired coverage zones. FIG. 3 illustrates an example of such beamforming (in one spatial dimension for simplicity). As shown, a shaped beam 30 includes nulls proximate locations of main lobes 41, 42 of ATC uplink transmissions. As further illustrated, the beamshaping may result in loss of gain with respect to a reference beam 30' that does not have such targeted nulls.

In embodiments of the present invention, such satellite beamforming may be done for all or some of the spot beams of an SBN. The beamforming, in general, may be fixed and/or adaptive. In fixed beamforming, weight calculation for the beamforming may be based, for example, on a priori knowledge of ATC location and uplink power.

In adaptive beamforming, weight calculation may be based, for example, on amplitudes and phases of signals received by satellite antennas of the SBN, which may be referred to as adaptive nulling. In some embodiments, adaptive beamforming may not be based on characteristics of received signals, such as embedded pilot signals. For example, waveform blind techniques may be used to make the system capable of adapting to potential interference of unknown waveform. Known techniques, such as those based on a linearly constrained minimum covariance (LMCV) algorithm, such as the Frost Algorithm, may be used.

Such an algorithm may be used in both fixed and adaptive satellite beamforming in some embodiments of the present invention. For example, fixed beamforming may use such an algorithm to calculate a fixed weight using fixed values for desired beam location and shape and ATC location and uplink power. Adaptive beamforming may use a fixed value for desired beam location and beam shape, but may rely on additional input parameters including received signal amplitude and phase, which generally are time varying.

According to some embodiments of the present invention, SBN beamforming to reduce return link interference from ATN operations may increase or maximize a carrier to noise plus interference (C/N+I) ratio for each spot beam, which may be done using fixed and/or adaptive techniques. The beamforming techniques may be waveform-aware and/or waveform-blind. Waveform-blind techniques may be advantageous in that the air interface(s) may be changed without affecting the beamformer. However, waveform-aware techniques may provide better performance.

According to some embodiments, the beamforming places spatial nulls in the direction of ATC sites. To the extent allowed by the degrees of freedom of the satellite antenna(s), nulls may be placed in the directions of cochannel satellite users. The degrees of freedom are generally one less than the number of antenna elements in the satellite antenna array. Deeper nulls may be placed towards the sources of greater interference, but placing deep nulls too close to the main beam may reduce the uplink margin.

Beamforming may be performed on the satellite and/or in the ground station communicating therewith, i.e., using ground-based beamforming (GBBF). Ground based beamforming may be advantageous because of an increased ability to reconfigure and to implement more complex signal processing than may be possible on the satellite due to space qualification and mass limitations.

According to certain embodiments of the present invention, such SBN return link beamforming may be used in combination with a bandwidth structure along the lines discussed above with reference to FIG. 2, the use of user terminals with relatively low gain antennas, the use of satellites with relatively high gain antennas that provide relatively small spot beams, the use of relatively low information rates for SBN services, the use of ATN base stations having antennas with relatively high isolation towards satellites of the SBN, the use of forward link margin control for the SBN and/or use of return link power control for the ATN. These combined measures may enable complete or partially frequency-overlapping operation of the SBN and the ATN in particular coverage areas served by both networks.

According to some embodiments of the present invention, measures may be taken to mitigate return link (uplink) interference from the ATN to the SBN to allow at least partially frequency-overlapping operation of the networks. According to some embodiments, ATN emissions may be designed to be relatively broadband in the forward and return links, while the SBN air interface may be designed to be relatively narrowband in the forward and return links, as discussed above with reference to FIG. 2.

Figure 4:
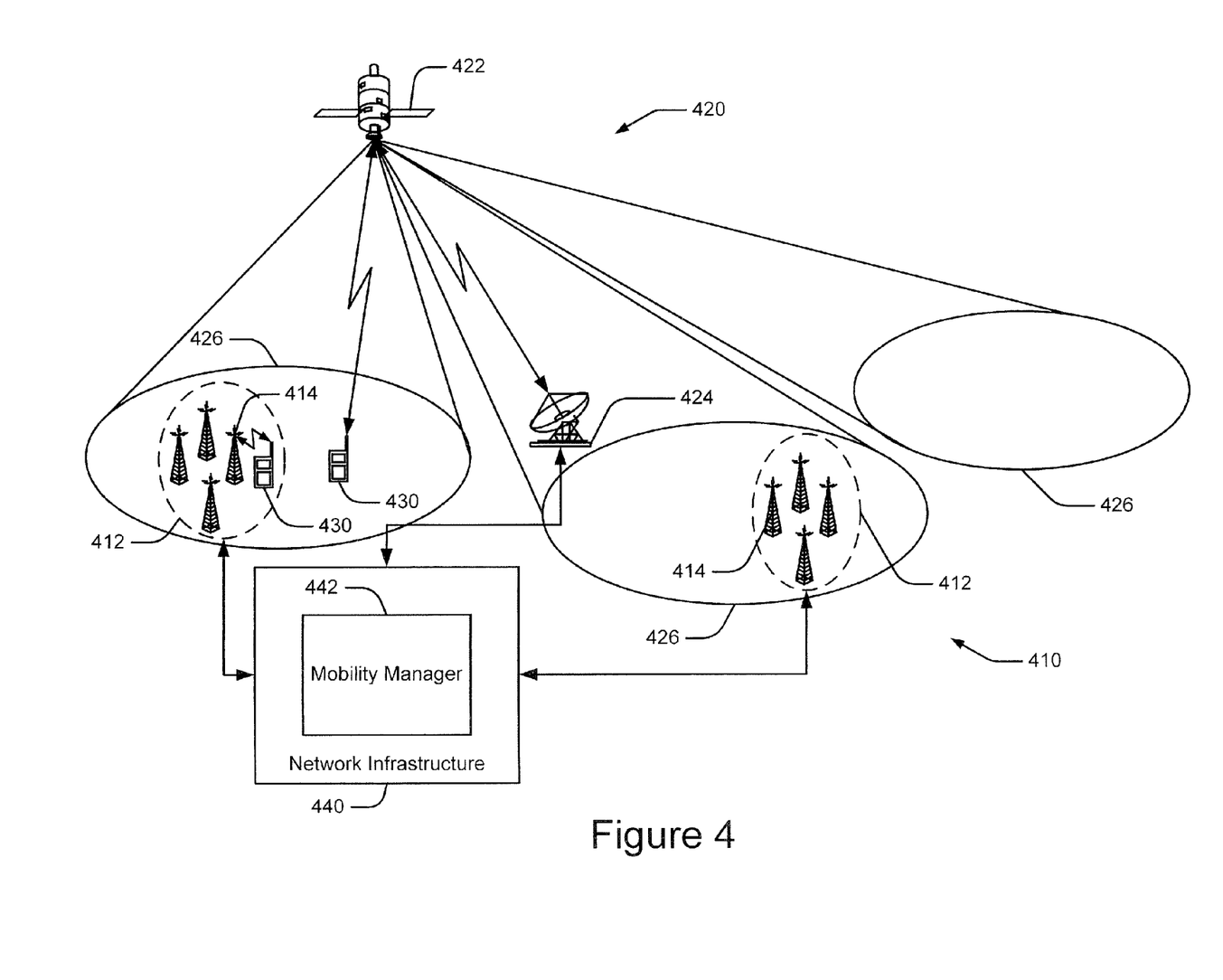
FIG. 4 is a schematic diagram illustrating a communications system and operations thereof according to some embodiments of the present invention.

In particular, referring to FIG. 4, an SBN 420 may include one or more satellites 422, which provide spot beams 426 for communicating with terminals 430. The SBN 420 may further include a ground station 424 which serves as a gateway to a ground-based network infrastructure 440, which may include, for example, mobile switching centers (MSCs), location registers, backbone networks (e.g., fiber optic networks) and other network infrastructure that supports communications of terminals 430 via the one or more satellites 422. An ATN 410 includes one or more ATCs 412, which are employed in higher user density environments, such as urban and/or suburban areas and which generally may include a plurality of base stations 414, which may be distributed to provide terrestrial coverage cells. The ATN 410 is also communicatively coupled to the ground-based network infrastructure 440. As shown in FIG. 4, the network infrastructure 440 may further include a mobility manager 442, which is configured to manage mobility of terminals 430 as they move with respect to coverage zones of the SBN 410 and the ATN 420. The mobility manager 442 may be implemented, for example, using network hardware and associated software operating in components of the network infrastructure, such as base station controllers (BSCs), MSCs and the like. It will be further appreciated that some aspects of mobility management may also include operations within the terminals 430 themselves.

Figure 5:
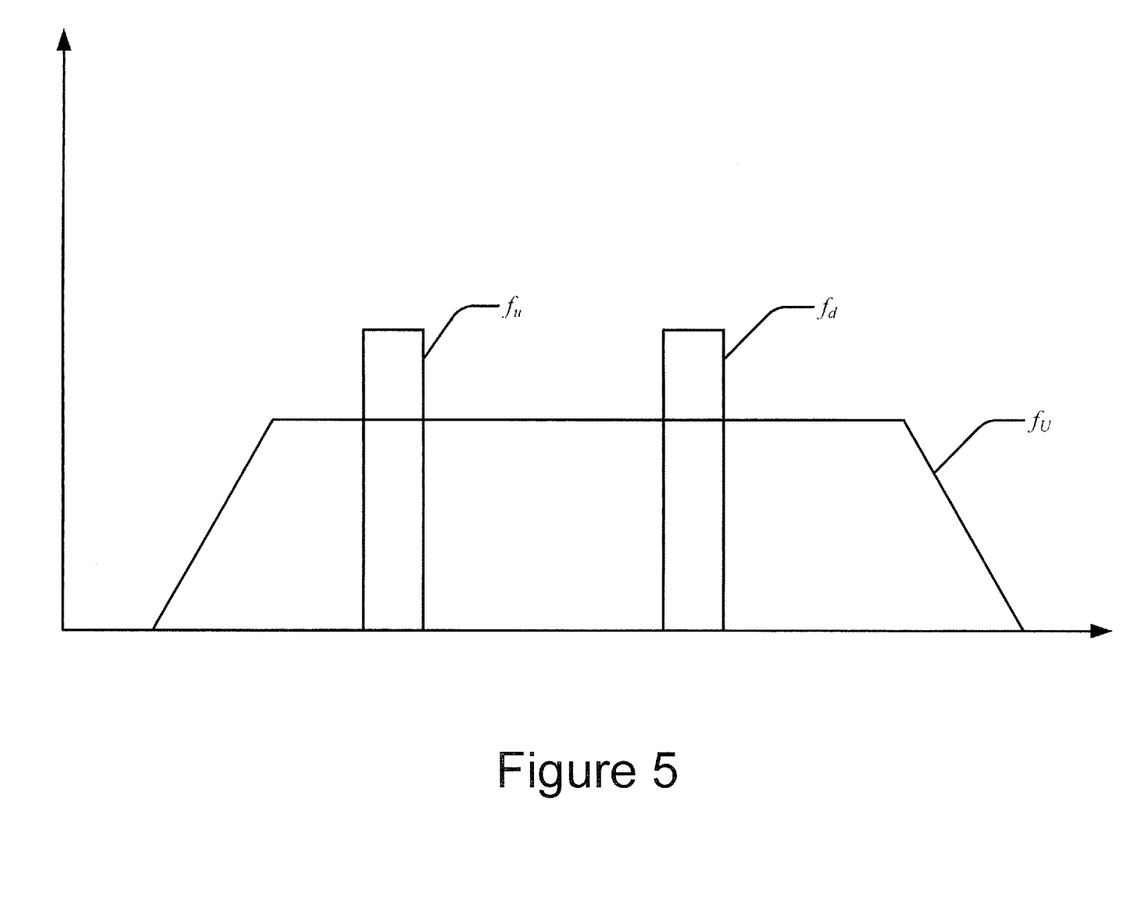
FIG. 5 is a diagram illustrating spectral assignments of an SBN and an ATN of the system of FIG. 4.

Referring to FIG. 5, the ATN 410 may use a TDD air interface over uplink and downlink bands $f_u$, $f_d$, which are overlaid over an uplink band $f_U$ of an SBN 420. The SBN 420 may use, for example, a TDD or an FDD interface. In such an arrangement, uplink and downlink communications of the ATN 410 may produce interference on the uplinks of the SBN 420. In cases where the ATN 410 uses an FDD air interface, such interference may only come from the uplinks of the ATN 410. However, in some embodiments of the present invention, using relatively broadband emissions on the uplinks and downlinks of the ATN 410, the net uplink power may be spread over the ATN channel bandwidth, thus reducing the interference on the relatively narrowband uplinks of the SBN 420.

If the forward links of the ATN 410 could be a source of interference on the SBN uplinks, the antennas of the base stations 414 of the ATN 410 may be configured to provide a relatively high degree of isolation (e.g., about 10 dB to 15 dB) with respect to the satellite(s) of the SBN. The transmit spectra of the ATN base stations 414 may also be shaped to create nulls proximate the frequencies used by the SBN 420. This may help reduce interference on the SBN uplinks, but may be optional in practical systems.

Interference on the SBN uplinks may be further reduced by limiting deployment of the ATN 410 to urban areas. In addition, the terminals 430 may be handheld user terminals with relatively low gain antennas. When averaged over the ensemble of all deployed user terminals, such low-gain handheld user terminals may show an antenna gain towards the satellite(s) 422 of the SBN 420 that is considerably less than the peak gain of the antenna, e.g., on the order of 4 dB less. In addition, in urban areas, there tends to be considerable blockage of satellite propagation. Such factors may reduce uplink radiation from the user terminals 430 by as much as 10 dB relative to free space propagation from 0 dBi gain terminals.

The SBN 420 may use satellites 422 with relatively high gain antennas, such that the spotbeams 426 are relatively small. Achieving such gain may require the use of a relatively large reflector in a geosynchronous satellite. The use of relatively small spotbeams can reduce the number of ATCs 412 within a particular spotbeam 426. As the interference power spectral densities from different ATCs may be additive at the satellite, having a large reflector satellite antenna may be advantageous. As discussed above. SBN uplink beamforming can further reduce ATN interference from spotbeams other than the desired (i.e., the "victim" spotbeam).

The SBN 420 may be constrained to provide only relatively low information rate services, such that the signal energy per bit (Eb) can be relatively large. This may help keep $E_b/(N_0+I_{0(intra-SBN)}+I_{0(ATN)})$ at a value sufficiently high for practical designs.

User terminals 430 may use automatic power control when communicating with the ATN 410, such that each terminal 430 uses substantially the minimum power necessary to maintain a link with the ATN 410. This can further reduce interference caused by such transmissions on the SBN uplinks. Return power link control may also be used in communications between terminals 430 and the SBN 420 to enable the satellite communications signals to override return link interference caused by the ATN 410.

Embodiments of the present invention further include mitigating interference associated with the SBN downlink. At least two interference mechanisms may be at work; from the SBN to the ATN, and from the ATN to the SBN.

SBN to ATN interference may take the form of narrowband interference at the user terminal receiver. This may be mitigated by creating nulls in the downlink spectrum of the ATN 410, so that the subbands used by the SBN 420 are avoided. Another technique for mitigating such interference may be to utilize a sufficiently wide bandwidth for the downlinks of the ATN 410 downlink and employing frequency spreading to mitigate the narrowband interference from the SBN 420. This approach may whiten the interference spectrum before bit decisions are made by the demodulator of a terminal 430. Deployment of ATCs 412 in mostly urban areas may also mitigate such interference due to blocking by structures. Antenna spatial beam nulling on the downlinks of the SBN 420 downlink in the direction of certain ATCs 412 of the ATN 410 may be used to further minimize SBN radiation into the downlinks of the ATN 410. This technique may be particularly appropriate in relatively large contiguous areas of ATN coverage where SBN coverage may be of secondary importance.

ATN to SBN interference may take the form of cochannel interference (for completely frequency-overlapped operation) and/or sideband interference (for partially frequency-overlapped operation) from a proximate ATN base station 414 to a terminal 430 communicating with the SBN 420. If the ATN downlink signal has a significantly greater bandwidth in comparison to the SBN downlink, the interference may take the form of an additive interference power spectral density at the receiving terminal. If the ATN base station 414 is relatively high power (e.g., if it has characteristics along the lines of 4G) and is operating in relatively open terrain, the interference contribution may be sufficiently large to impair the SBN downlink outside the nominal coverage zone of the ATN base station 414. This could entail the presence of an annular region of no communication, terrestrial or satellite, around the coverage zone (e.g., cell) served by the base station 414.

This problem may be overcome by designing the SBN downlink to have automatic margin control such that the margin may be increased for a given terminal on demand to reduce or eliminate the annular blind spot. The margin control may be implemented using satellite carrier power control and/or adaptive information rate control on the SBN downlink. Such automatic downlink margin control generally may be implemented in the SBN 420, in conjunction with operations (e.g., received signal strength measurements) of the terminals 430.

Measures may be taken to mitigate interference on the ATN uplink from the SBN. If terminals communicating with the SBN 420 are cochannel or at least partially frequency-overlapped with the ATN 410 and are allowed to get too close to an ATN base station 414, they may cause an undesirable rise in the received noise floor of the ATN base station 414. This may be mitigated by enabling handover from the SBN 420 to the ATN 410, i.e., by using dual-mode terminals and the mobility manager 442 supporting handover between the ATN 410 and the SBN 420.

According to some embodiments, the mobility manager 442 may be configured to sense proximity of a terminal 430 to a base station 414 of the ATN 410 while in an "idle" mode (i.e., not engaged in an active call), and the transfer of registration from the SBN 420 to the ATN 410 when the presence is detected. This may entail the use of a satellite air interface that allows for the terminal 430 to periodically sense carriers other than the one on which the terminal 430 is currently camped, and synchronizing to such carriers and demodulating certain control channels, such as broadcast control channels, on those carriers. Such techniques are described, for example, in U.S. patent application Ser. No. 10/948,606 to Dutta et al., filed Sep. 23, 2004 and U.S. patent application Ser. No. 11/548,825 to Dutta et al., filed Oct. 12, 2006, the disclosures of which are incorporated herein by reference in their entirety. While idle mode roaming may help avoid potentially harmful interference from a terminal 430 to the ATN 410, additional mitigation of such interference may be provided by in-call handover. An alternative or adjunct to idle-mode roaming may be the use of roaming based on a location scheme, such as one using GPS, that is independent of support from the air interface.

According to some embodiments of the invention, measures may be taken to mitigate downlink interference from the SBN 420 to the ATN 410 to enable overlaid use of frequencies. Downlink interference from the SBN 420 to the ATN 410 may generally not be a problem, as the propagation distance advantage of terrestrial cells over satellite spotbeams may allow terrestrial base stations 414 to overcome background disturbances caused by satellite transmissions using, for example, forward link power control and/or data rate control. In applications in which an ATC 412 serves a generally urban area, this propagation distance advantage can be enhanced by clutter from structures.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A communications system comprising:
a space-based network (SBN) comprising at least one satellite that generates a plurality of spot beams using a first set of frequencies; and
an ancillary terrestrial network (ATN) using a second set of radio frequencies,
wherein, in a coverage zone of a given spot beam wherein the SBN and the ATN use at least one frequency from the first and second sets of frequencies in common the SBN uses a narrower bandwidth than the ATN on both forward and return links, the ATN employs frequency spreading on at least its return link communications, the SBN employs spatial beam nulling directed toward at least one ancillary terrestrial component (ATC) of the ATN, the SBN employs forward link margin control, the ATN employs return link power control, the SBN employs return link power control and base stations of the ATN provide isolation in a direction of at least one satellite of the SBN;
wherein the forward link margin control employed by the SBN is configured to provide a terminal communicating with the SBN increased link margin to override interference from a proximate ATN base station until the terminal is in a nominal coverage zone of the proximate ATN base station.

2. The system of claim 1, wherein the SBN employs fixed and/or adaptive return link spatial beam nulling.

3. The system of claim 2, wherein the SBN employs waveform-blind and/or waveform-aware return link spatial beam nulling.

4. The system of claim 3, wherein the SBN employs return link beamforming based on a linear constrained mean variance (LCMV) algorithm.

5. The system of claim 1, wherein base stations of the ATN employ spectral nulling at frequencies from the first set of radio frequencies.

6. The system of claim 1, wherein the SBN employs forward link spatial beam nulling toward at least one ATC of the ATN.

7. The system of claim 1, wherein the forward link margin control employed by the SBN is configured to provide a terminal communicating with the SBN increased link margin to override interference from a proximate ATN base station.

8. The system of claim 1, wherein the forward link margin control employed by the SBN comprises adaptive power control and/or adaptive information rate control.

9. The system of claim 1, further comprising a mobility manager configured to support transfer of communications of a terminal between the SBN and the ATN based on proximity to a base station of the ATN.

10. The system of claim 9, wherein the mobility manager supports idle roaming and/or in-call handover.

11. The system of claim 9, wherein the mobility manager is configured to support transfer of terminal communications between the SBN and the ATN using location information from a location information source other than the SBN or the ATN.

12. The system of claim 11, wherein the location information source other than the SBN or the ATN comprises GPS.

13. The system of claim 1, wherein the base stations provide isolation with respect to satellites of the SBN in a range from around 10 dB to around 15 dB.

14. The system of claim 1, wherein the ATN and the SBN are configured to support completely or partially overlapping use of the first and second sets of radio frequencies.

15. A method of operating a communications system comprising an space-based network (SBN) comprising a plurality of spotbeams using a first set of frequencies and an ancillary terrestrial network (ATN) using a second set of radio frequencies, the method comprising:
operating the SBN and the ATN such that, in a given coverage zone of a given spot beam the SBN and the ATN use at least one frequency from the first and second sets of frequencies in common and, in the given coverage zone:
the SBN using a narrower bandwidth than the ATN on both forward and return links;
the ATN employing frequency spreading on at least its return link communications;
the SBN employing spatial beam nulling directed toward at least one ancillary terrestrial component (ATC) of the ATN;
the SBN employing forward link margin control;
the ATN employing return link power control;
the SBN employing return link power control;
base stations of the ATN providing isolation in a direction of at least one satellite of the SBN; and
wherein the forward link margin control employed by the SBN is configured to provide a terminal communicating with the SBN increased link margin to override interference from a proximate ATN base station until the terminal is in a nominal coverage zone of the proximate ATN base station.

16. The method of claim 15, wherein the spatial beam nulling comprises fixed and/or adaptive return link spatial beam nulling.

17. The method of claim 16, wherein the adaptive return link spatial beam nulling comprises waveform-blind and/or waveform-aware return link spatial beam nulling.

18. The method of claim 17, wherein the adaptive return link spatial beam nulling comprise return link spatial beamforming based on a linear constrained mean variance (LCMV) algorithm.

19. The method of claim 15, further comprising base stations of the ATN employing spectral nulling at frequencies from the first set of radio frequencies.

20. The method of claim 15, further comprising the SBN employing forward link spatial beam nulling toward at least one ATC of the ATN.

21. The method of claim 15, wherein the forward link margin control employed by the SBN is configured to provide a terminal communicating with the SBN increased link margin to override interference from a proximate ATN base station.

22. The method of claim 15, wherein the forward link margin control employed by the SBN comprises adaptive power control and/or adaptive information rate control.

23. The method of claim 15, further comprising managing terminal mobility to support transfer of communications of a terminal between the SBN and the ATN based on proximity to a base station of the ATN.

24. The method of claim 23, wherein managing terminal mobility comprises supporting idle roaming and/or in-call handover.

25. The method of claim 23, wherein managing terminal mobility comprises supporting transfer of terminal communications between the SBN and the ATN using location information from a location information source other than the SBN or the ATN.

26. The method of claim 24, wherein the location information source other than the SBN or the ATN comprises GPS.

27. The method of claim 15, further comprising the base stations of the ATN providing isolation with respect to satellites of the SBN in a range from around 10 dB to around 15 dB.

28. The method of claim 15, comprising the ATN and the SBN supporting completely or partially overlapping use of the first and second sets of radio frequencies.

29. A communication system comprising:
a space-based network (SBN) comprising at least one satellite that generates a plurality of spot beams using a set of frequencies and configured, in a coverage zone of a given spot beam wherein the SBN and an ancillary terrestrial network (ATN) use at least one frequency in common, to use a narrower bandwidth than the ATN on both forward and return links, to employ spatial beam nulling directed toward at least one ancillary terrestrial component (ATC) of the ATN, to employ return link power control and to employ forward link margin control;
wherein the forward link margin control employed by the SBN is configured to provide a terminal communicating with the SBN increased link margin to override interference from a proximate ATN base station until the terminal is in a nominal coverage zone of the proximate ATN base station.

30. The system of claim 29, wherein the SBN is configured employ fixed and/or adaptive return link spatial beam nulling.

31. The system of claim 29, wherein the SBN is configured to employ forward link spatial beam nulling toward at least one ATC of the ATN.

32. The system of claim 29, wherein the forward link margin control employed by the SBN is configured to provide a terminal communicating with the SBN increased link margin to override interference from a proximate ATN base station.

33. The system of claim 29, wherein the forward link margin control employed by the SBN comprises adaptive power control and/or adaptive information rate control.

34. The system of claim 29, further comprising a mobility manager configured to support transfer of communications of a terminal between the SBN and the ATN based on proximity to a base station of the ATN.

35. The system of claim 34, wherein the mobility manager supports idle roaming and/or in-call handover.

36. A communication system comprising:
an ancillary terrestrial network (ATN) comprising a plurality of ancillary terrestrial components (ATCs), each comprising at least one base station, the ATN configured, in a coverage zone of a given spot beam wherein an space-based network (SBN) and the ATN use at least one frequency in common, to use a bandwidth broader than the SBN on both forward and return links, to employ frequency spreading on at least its return link communications, to employ return link power control and to provide isolation of ATN base stations in a direction of at least one satellite of the SBN;
wherein forward link margin control employed by the SBN is configured to provide a terminal communicating with the SBN increased link margin to override interference from a proximate ATN base station until the terminal is in a nominal coverage zone of the proximate ATN base station.

37. The system of claim 36, wherein base stations of the ATN employ spectral nulling at frequencies used by the SBN.

38. The system of claim 36, further comprising a mobility manager configured to support transfer of communications of a terminal between the SBN and the ATN based on proximity to a base station of the ATN.

39. The system of claim 38, wherein the mobility manager supports idle roaming and/or in-call handover.

40. The system of claim 36, wherein the base stations provide isolation with respect to satellites of the SBN in a range from around 10 dB to around 15 dB.

* * * * *